United States Patent Office 3,165,537
Patented Jan. 12, 1965

3,165,537
PREPARATION OF BENZOFURAN DERIVATIVES
Leonard Jurd, Berkeley, Calif., assignor to the United
States of America as represented by the Secretary of
Agriculture
No Drawing. Filed July 8, 1963, Ser. No. 293,564
1 Claim. (Cl. 260—346.2)
(Granted under Title 35, U.S. Code (1952), sec. 266)

A non-exclusive, irrevocable, royalty-free license in the invention herein described, throughout the world for all purposes of the United States Government. with the power to grant sublicenses for such purposes, is hereby granted to the Government of the United States of America.

This invention relates to and has among its objects the provision of novel methods for preparing benzofuran derivatives. A particular object of the invention is the synthesis of benzofuran derivatives by oxidation of flavylium salts.

Further objects and advantages of the invention will be evident from the following description wherein parts and percentages are by weight unless otherwise specified.

In accordance with the invention, benzofuran derivatives are prepared by oxidizing flavylium salts. By this technique many different types of benzofuran compounds can be prepared in a single step and with yields at least as high as 50% of the theoretical. The reaction may be exemplified by the following formulas which depict the synthesis of 2 - (4 - hydroxyphenyl)-3-acetylbenzofuran from 3-methyl-4'-hydroxyflavylium chloride, i.e.

(I)

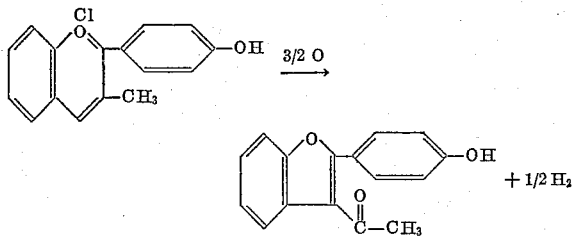

The process of the invention is by no means limited to the example above but can be applied to flavylium salts of all kinds and generally the synthesis may be represented by the formulas (II)

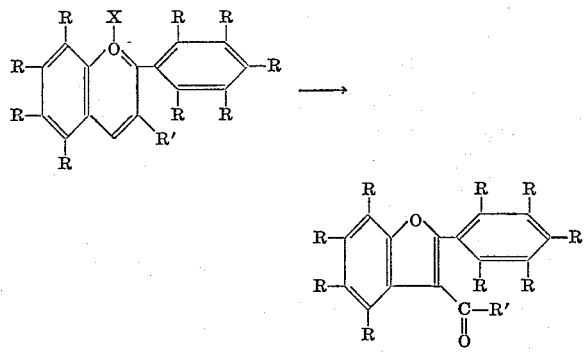

wherein each R and R' are radicals which are inert in the reaction, i.e., they are not affected by the action of a peroxide, and wherein X is an anion.

It is evident from the above formulas that the oxidation has the end result of rearranging the benzopyrylium ring into a benzofuran ring and conversion of the ring carbon atom at position 3 into a side-chain carbonyl,

group. Otherwise stated, the synthesis may be considered to involve (a) opening of the benzopyrylium ring between the 2 and 3 positions, (b) reclosing of the ring between the 2 and 4 positions, and (c) oxidation of the ring carbon atom originally at position 3 to a side-chain carbonyl radical. This sequence is depicted below merely to explain the end result—which has been definitely determined—but without delimiting the invention to the particular mechanisms shown:

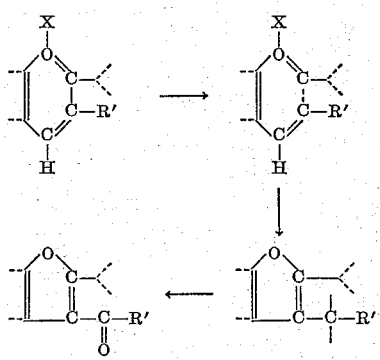

A significant advantage of the process of the invention is its versatility in that many different kinds of benzofuran derivatives may be prepared simply by selecting the appropriate flavylium salt starting material. As evident from the preceding formulas, the various substituents (R and R') are unaltered in the synthesis and thus are present in the benzofuran product. Indeed, all the substituents designated by R maintain their same relative position. In the case of the substituent at position 3, that is, R', the rearrangement of the benzopyrylium ring to a benzofuran ring and formation of the carbonyl side group give rise to a new side-chain at the corresponding position of the benzofuran nucleus. Specifically, the substituent R' present on the flavylium salt is converted into a substituent

This unique transformation permits one to create many different types of substituents at position 3 on the benzofuran product. For example, if R' is a hydrocarbon group or a substituted hydrocarbon group, a ketone group is formed, e.g., a —CH$_3$ group is converted into a

group, a —C$_6$H$_4$—OH group is converted into

a —C$_6$H$_4$OCH$_3$ group is converted into a

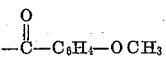

group, etc. If R' is an ether radical, an ester group is formed, e.g., an —OCH$_3$ group is converted into

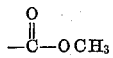

an —OC₆H₄OCH₃ group is converted into

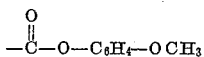

etc. Such ester formation is particularly advantageous where it is desired to synthesize benzofuran derivatives having a carboxyl group (—COOH) at position 3. In such case, the oxidation is applied to a flavylium salt having an ether group in the 3 position, for example, a methoxy, ethoxy, phenoxy, or benzoxy group. This then yields the benzofuran derivative having an ester group at position 3. Thus, the above stated examples yield the carbomethoxy, carboethoxy, carbophenoxy, and carbobenzoxy groups, respectively, at postion 3 in the benzofuran products. These ester groups—or any others—can then be readily converted to carboxyl by contacting the product with aqueous alkali. The significance of all this is that the process of the invention provides a technique by which one can synthesize benzofurans containing particular substituents at position 3, which compounds either cannot be prepared by conventional syntheses or which would require elaborate multi-step syntheses with very poor yields if they could be synthesized.

As noted hereinabove, the process of the invention is of a very versatile character and may be applied to all types of flavylium salts wherein R and R' are radicals which are not affected by the oxidation reaction. Typical of such substituents are those set forth below by way of illustration but not limitation:

The radicals represented by the R's may typically be such radicals as hydrogen; hydroxy; lower alkyl, e.g., methyl, ethyl, propyl, isopropyl, butyl; lower alkoxy, e.g., methoxy, ethoxy, propoxy, isopropoxy, butoxy; benzoxy; phenoxy; etc. The radical represented by R' may typically be such radicals as lower alkyl, e.g., methyl, ethyl, propyl, isopropyl, butyl; lower alkoxy, e.g., methoxy, ethoxy, propoxy, isopropoxy, butoxy; phenyl; lower alkylphenyl; lower alkoxyphenyl; phenoxy; lower alkylphenoxy; lower alkoxyphenoxy; benzyl; lower alkylbenzyl; lower alkoxybenzyl; benzoxy; lower alkylbenzoxy; lower alkoxybenzoxy; carboxy-lower alkyl; carboxy-lower alkoxy; carboxyphenyl; carboxyphenoxy; carboxybenzyl; carboxybenzoxy, etc. The radical represented by X is usually the chloride ion but may be the anion of other acids, e.g., the bromide, sulphate, bisulphate, benzenesulphonate, paratoluenesulphonate, etc. ion.

The oxidation in accordance with the invention basically involves contacting the flavylium salt with an oxidizing agent which contains a peroxide linkage, such compounds being commonly referred to as peroxygen oxidizing agents. Typical of these are hydrogen peroxide, sodium peroxide, acetyl peroxide, benzoyl peroxide, tertiary butyl hydroperoxide, alkali metal salts of tertiary butyl peroxide, ascaridole, urea peroxide, alkali metal salts of per-acids such as peracetic, persulphuric, perbenzoic, and the like. Generally, the reaction is carried out in an inert solvent such as methanol, ethanol, isopropanol, tertiary butyl alcohol, or the like. To assist in dissolving the flavylium compound it is often necessary to add water to the solvent and more preferable than plain water is a conventional buffer solution having a pH of about four to six. Generally, it is preferred to heat the aqueous-alcohol system to assist in dissolving the flavylium salt and it may be heated to as high as its boiling point which may be as high as about 100° C. in appropriate cases. The temperature at which the reaction is carried out is not critical and may range from 100° C. down to room temperature or even below room temperature although it is obvious that the speed of reaction will be slower at the lower temperatures. A convenient plan of operation is to dissolve the flavylium salt in the alcohol-water or alcohol-buffer system, applying heat to bring the system to about 70–100° C., and then add the oxidizing agent and allow the system to stand without applying any more heating. The reaction proceeds quite rapidly under such conditions and the product is formed in a matter of a few minutes to an hour at the outside. The amount of oxidizing agent used is generally in excess of the stoichiometric amount. The product is easily recovered from the system by diluting it with water. The precipitated product can then be collected and recrystallized in conventional manner from aqueous methanol or methanol-acetone mixtures.

The benzofuran derivatives, which are the subject of this invention, form a class of compounds which exhibit estrogenic properties directly or which can be readily converted into compounds which are estrogenic. Particularly effective in this regard are the compounds which contain hydroxy and/or methoxy groups on the fused benzene nucleus and on the side-chain phenyl nucleus. Because of this estrogenic activity, the products of the invention may be employed in animal husbandry—in the same manner as conventional with diethylstilbestrol and other known estrogenic agents—for the purpose of increasing weight gain and increasing efficiency of feed utilization. To this end, the compounds of the invention may be administered to animals by incorporating them in conventional feeds; by addition to water or other fluid; by addition to grit fed to birds; by administration in capsules, pellets, or by injection; by implantation of pellets, and so forth. The amount of the compounds to be administered will, of course, vary depending on the type of animal, the body weight thereof, the physiological response desired, and the mode of administration. For example, where the benzofuran derivatives are administered in admixture with a feed, dosage may be that physiologically equivalent to about from 0.01 to 8 milligrams of diethylstilbestrol per 100 lbs. of body weight per day. Generally, it is preferred to administer them by incorporation in a conventional feed. Thus the feed may consist mainly of vegetable material such as corn, wheat, barley, milo, hay, dehydrated alfalfa or other forage material, soybean meal, cottonseed meal, distillers' grains, peanut meal, oat hulls, bran, corn stalks, corn cobs, sorghum, beet pulp, or the like. For a high-energy diet a major proportion of grain or oil-seed meal is preferred. In addition to the main vegetable portion, the feed may contain the usual supplements such as mineral salts, vitamin preparations, fish meal, fish oil, linseed oil, antibiotic supplements, and so forth. In general, the feed may contain on the order of 0.001 to 1 lb. of the benzofuran derivative per ton of feed. The benzofuran derivatives may be applied, for example, to chickens, turkeys, geese, ducks, swine, sheep, cattle, horses, and so forth. Thereby, important practical effects are gained, including increased rate of gain and increased efficiency of feed utilization. As noted above, the invention is of particularly practical value as applied to animals, such as steers, which are grown primarily for meat. Thus, by application of the teachings of the invention, the animals are caused to gain weight more rapidly and produce more flesh per unit weight of feed with resulting economic benefits.

Another phase of the present invention concerns the preparation of coumestrol and related compounds from benzofurans. Coumestrol is an estrogenic coumarinocoumarone which has been isolated from alfalfa and a variety of clover species—Bickoff and Booth, U.S. Patent 2,890,116. Coumestrol has also been synthesized (Emerson and Bickoff, U.S. Patent 2,884,427) and various derivatives thereof such as the esters and ethers have also been synthesized (Bickoff and Booth, U.S. Patents 2,929,713 and 2,987,398) and shown to have estrogenic properties.

By applying the principles described herein, coumestrol and various other coumarino-coumarones are synthesized by a procedure which is simple and which affords high yields. Basically, the synthesis involves the following steps: By oxidation of the appropriate flavylium salt, as described above, there is prepared a benzofuran containing an ester group at the 3 position and containing a hydroxy group on the phenyl ring in ortho position. This benzofuran is then contacted with acid whereby lactonization occurs and a coumarino-coumarone is formed. The synthesis of coumestrol from 2',4',7-trihydroxy-3-methoxy flavylium chloride is shown by the following formulas:

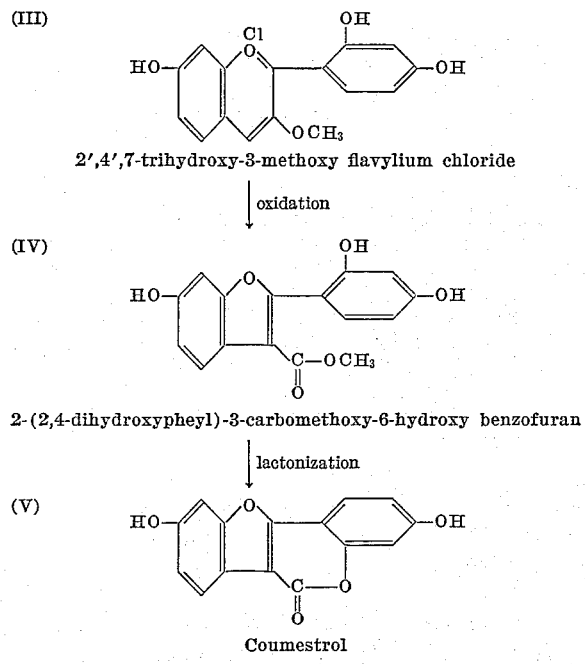

The process of the invention is by no means limited to the example given above but can be employed to prepare coumarino-coumarones of all kinds by selection of the appropriate starting materials. Thus generically, the synthesis may be represented by the formulas:

wherein the radicals represented by R and X are as described hereinabove and R'' represents a hydrocarbon or a substituted hydrocarbon radical as, for example, lower alkyl, phenyl, benzyl, lower alkylphenyl, lower alkylbenzyl, lower alkoxyphenyl, lower alkoxybenzyl, etc. It is to be noted that the particular configuration of the radical represented by R'' is of no importance as it does not appear in the final product; it merely serves as a blocking group during the oxidation. Accordingly, regarding the lactonization reaction, the radical $$-\overset{\overset{\displaystyle O}{\|}}{C}-O-R''$$

may be any esterified carboxyl radical. It may also be observed that the 2' and 6' positions on the phenyl ring are equivalent and the same product is obtained whether the ortho hydroxy group is considered as being at the 2' position or the 6' position. In the event that both the 2' and the 6' positions are occupied by hydroxy, a single coumarino-coumarone is produced if the phenyl ring is substituted symmetrically; where the substitution is unsymmetrical, a mixture of two isomeric products will be produced. This distinction is further demonstrated by the following formulas:

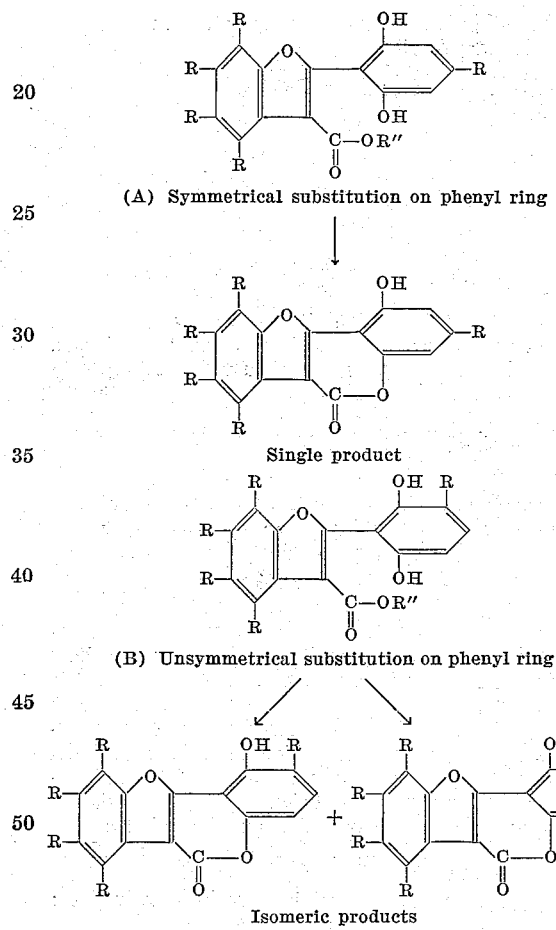

In preparing the coumarino-coumarones, the synthesis may be carried out by first producing the benzofuran derivative, isolating it, and then applying lactonization. However, isolation of the intermediate benzofuran is not necessary and ordinarily the lactonization is applied to the system containing the benzofuran as produced by the oxidation step. The lactonization step is carried out by exposing the benzofuran to acidic hydrolysis so that the ester group at position 3 is hydrolyzed and can then lactonize with the ortho hydroxy group on the phenyl ring. The acidic hydrolytic conditions are established as conventional in other lactonization procedures, by contacting the benzofuran in an aqueous system with a strong acid, for example, hydrochloric, sulphuric, or benzenesulphonic, or the like. Heating, for example, up to a temperature of about 75–100° C., may be applied to hasten the lactonization. The coumarino-coumarones, particularly those which contain hydroxy and/or methoxy groups on the coumarine or the coumarone moieties, exhibit estrogenic activity and can be used for the same purposes as described above for the benzofurans, i.e., in animal feeding, to attain increased rate of gain and increased efficiency of feed utilization.

The flavylium salts employed as starting materials in the preparation of the benzofurans or coumarino-coumarones are most readily prepared by the Robinson method (see, for example, D. D. Pratt and R. Robinson, J. Chem. Soc., 1923, page 745 et seq.) which involves condensation of (1) orthohydroxy benzaldehyde or its substituted derivatives with (2) acetophenone or the substituted derivatives thereof. By selection of the substituents on the respective reactants, any desired flavylium derivative may be produced. Typical applications of this synthesis are also disclosed in my copending patent application, Serial No. 254,030 filed January 25, 1963.

EXAMPLES

The invention is further demonstrated by the following illustrative examples.

The benzofuran products of Examples I to XIII have the following structure:

(VI)

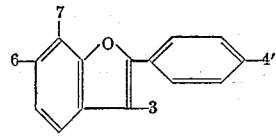

wherein 3, 6, 7, and 4' are specifically identified in each of the examples.

The buffer solution referred to in the examples was an aqueous solution of citric acid and disodium hydrogen phosphate in proportions to provide a pH of 5.8.

EXAMPLE I

*Preparation of 2-(4-Hydroxyphenyl)3-Acetyl Benzofuran*

Structure: Formula VI: $3 = -\overset{O}{\underset{\|}{C}}-CH_3$, $6 = H$, $7 = H$, $4' = OH$ 4'-hydroxyflavylium chloride (30 g.) was mixed into boiling methanol (300 ml.) and then there was added buffer solution (300 ml.) and 30% aqueous $H_2O_2$ (60 ml.). After mixing these components, heating was stopped and the solution allowed to cool to room temperature. It was observed that in a minute pale yellow crystals were forming in the system. After standing for one hour, water was added to bring the total volume to one liter and the precipitate was separated and recrystallized from acetone-methanol. The benzofuran product (15 g.) had a melting point of 173–173.5° C. and displayed the following ultraviolet absorption characteristics: In ethanol: peaks at 234 and 313 and inflection at 260 m$\mu$. In ethanol plus sodium ethylate (0.02 N): peaks at 249, 268, and 365 m$\mu$.

The product was converted into various derivatives: The acetate (Formula VI: $3 = -\overset{O}{\underset{\|}{C}}-CH_3$, $6 = H$, $7 = H$, $4' = -O-\overset{O}{\underset{\|}{C}}-CH_3$)

by reaction with acetic anhydride and sodium acetate; the benzyl ether (Formula VI: $3 = -\overset{O}{\underset{\|}{C}}-CH_3$, $6 = H$, $7 = H$, $4' = -O-CH_2-C_6H_5$)

by reaction with benzyl chloride and alkali; and the methyl ether (Formula VI; $3 = -\overset{O}{\underset{\|}{C}}-CH_3$, $6 = H$, $7 = H$, $4' = -OCH_3$)

by reaction with methyl iodide and alkali. The properties of these derivatives are as follows:

| | Melting point, °C. | UV absorption, m$\mu$ |
|---|---|---|
| Acetate | 132 | Peaks at 240 and 301. |
| Benzyl ether | 102 | |
| Methyl ether | 68 | Peaks at 223 and 311. |

EXAMPLE II

*Preparation of 2-(4-Hydroxyphenyl)3-Acetyl-7-Methoxybenzofuran*

Structure: Formula VI: $3 = -\overset{O}{\underset{\|}{C}}-CH_3$, $6 = H$, $7 = -OCH_3$, $4' = -OH$ To boiling methanol (600 ml.) was added 3-methyl-8-methoxy-4'-hydroxy flavylium chloride (60 g.), buffer solution (600 ml.), and 30% aqueous $H_2O_2$ (120 ml.). After mixing these components, heating was discontinued and the mixture allowed to come to room temperature. After standing for one hour, water was added to bring the total volume to about 2 liters and the precipitate collected and recrystallized from methanol-acetone. The benzofuran product (32 g.) was in the form of long colorless felted crystals, M.P. 222° C. and displayed the following UV absorption information: In ethanol: peak at 311, inflection at 263 m$\mu$. In ethanol plus NaOH: peaks at 252 and 362, inflection at 273 m$\mu$.

The product was converted into various derivatives: The acetate (Formula VI: $3 = -\overset{O}{\underset{\|}{C}}-CH_3$ $6 = H$, $7 = -OCH_3$, $4' = -O\overset{O}{\underset{\|}{C}}-CH_3$)

by reaction with acetic anhydride and sodium acetate; the benzoate (Formula VI: $3 = -\overset{O}{\underset{\|}{C}}-CH_3$, $6 = H$, $7 = OCH_3$, $4' = -O\overset{O}{\underset{\|}{C}}C_6H_5$)

by reaction with benzoyl chloride; the benzyl ether (Formula VI: $3 = -\overset{O}{\underset{\|}{C}}-CH_3$, $6 = H$, $7 = -OCH_3$, $4' = -OCH_2C_6H_5$)

by reaction with benzyl chloride and alkali; the methyl ether (Formula VI: $3 = -\overset{O}{\underset{\|}{C}}-CH_3$, $6 = H$, $7 = OCH_3$, $4' = -OCH_3$)

by reaction with methyl iodide and alkali; the oxime of the methyl ether (Formula VI: $3 = -\overset{NOH}{\underset{\|}{C}}-CH_3$, $6 = H$, $7 = -OCH_3$, $4' = -OH_3$)

by reaction of the methyl ether with hydroxylamine. Melting points of these derivatives were found to be:

| | M.P., ° C. |
|---|---|
| Acetate | 117 |
| Benzoate | 155 |
| Benzyl ether | 153–154 |
| Methyl ether | 98 |
| Oxime of methyl ether | 158 |

EXAMPLE III

*Preparation of 2-Phenyl-3-Acetyl-7-Methoxybenzofuran*

Structure: Formula VI: $3 = -\overset{O}{\underset{\|}{C}}-CH_3$, $6 = H$, $7 = -OCH_3$, $4' = H$ (A) o-Vanillin (15.2 g.) and propiophenone (13.4 g.) were dissolved in a mixture of ethyl acetate (50 ml.) and ethanol (10 ml.). The solution was saturated with HCl gas and allowed to stand overnight. Then the long orange needles of 3-methyl-8-methoxyl flavylium chloride which had formed were separated from the solution.

(B) To boiling methanol (200 ml.) was added the flavylium salt prepared above, buffer solution (50 ml.), and aqueous 30% $H_2O_2$ (30 ml.). Then additional buffer (50 ml.) and methanol (50 ml.) were added to keep the flavylium salt in solution. Heating was discontinued and the system allowed to come to room temperature. After standing for 20 minutes, excess water was added and the precipitated material was collected and recrystallized from methanol-acetone. The benzofuran product (9.2 g.) was in the form of long colorless needles, M.P. 107° C., and displayed (in ethanol) a peak at 289 mµ. The oxime derivative (Formula VI: 3 = —C(=NOH)—CH₃, 6 = H, 7 = —OCH₃, 4' = H)

and the benzal derivative (Formula VI: 3 = —C(=O)—CH = CHC₆H₅, 6 = H, 7 = —OCH₃, 4' = H)

of this product had melting points of 154° and 139–140° C., respectively.

EXAMPLE IV

*Preparation of 2-Phenyl-3-Acetyl-6-Hydroxybenzofuran*

Structure: Formula VI: 3 = —C(=O)—CH₃, 6 = —OH, 7 = H, 4' = H

To boiling methanol (50 ml.) was added 3-methyl-7-hydroxyflavylium chloride (4 g.), buffer solution (50 ml.) and 30% aqueous H₂O₂ (8 ml.). After mixing these components, heating was discontinued and the system allowed to cool. After standing about 4 hours the system was diluted with water and the precipitated material collected and recrystallized from methanol-acetone. The benzofuran product was in the form of colorless crystals, M.P. 159–160° C. The acetate (Formula VI: 3 = —C(=O)—CH₃, 6 = —O—C(=O)—CH₃, 7 = H, 4' = H)

had a melting point of 72° C.; the benzoate (Formula VI: 3 = —C(=O)—CH₃, 6 = —O—C(=O)·C₆H₅, 7 = H, 4' = H)

had a melting point of 134° C.

EXAMPLE V

*Preparation of 2-(4-Methoxyphenyl)-3-Acetyl-6-Hydroxybenzofuran*

Structure: Formula VI: 3 = —C(=O)—CH₃, 6 = OH, 7 = H, 4' = —OCH₃

To boiling methanol (40 ml.) was added 3-methyl-7-hydroxy-4'-methoxy-flavylium chloride (2 g.), 40 ml. buffer solution, and aqueous 30% H₂O₂ (2 ml.). After mixing these ingredients, heating was discontinued and the system was allowed to cool. After standing about 2 hours the mixture was diluted with water and the precipitated material collected and recrystallized from wet methanol. The benzofuran product was in the form of flat, slightly yellow needles, M.P. 150–151° C. The acetate (Formula VI: 3 = —C(=O)CH₃, 6 = —O—C(=O)—CH₃, 7 = H, 4' = —OCH₃)

had a melting point of 93° C. and exhibited a peak at 311 mµ (in ethanol).

EXAMPLE VI

*Preparation of 2-(4-Hydroxyphenyl)-3-Acetyl-6-Hydroxybenzofuran*

Structure: Formula VI: 3 = —C(=O)—CH₃, 6 = OH, 7 = H, 4' = —OH

To boiling methanol (40 ml.) was added 3-methyl-7-hydroxy-4'-hydroxy flavylium chloride (4 grams) and buffer solution (60 ml.). The solution was heated to boiling to completely dissolve the flavylium salt. Then, aqueous 30% H₂O₂ (8 ml.) was added and heating was discontinued. After standing for about 1½ hours the system was diluted with water and the precipitated crystals were collected and recrystallized from aqueous methanol. The benzofuran product (1.84 grams) was in the form of yellow needles, M.P. 228° C., and displayed peaks at 331 and 238 mµ (in ethanol).

Various derivatives were made of the product, including the acetate (Formula VI: 3 = —C(=O)—CH₃, 6 = —O—C(=O)—CH₃, 7 = H, 4' = —O—C(=O)—CH₃)

the benzoate (Formula VI: 3 = —C(=O)—CH₃, 6 = —O—C(=O)C₆H₅, 7 = H, 4' = —O—C(=O)C₆H₅)

the benzyl ether (Formula VI: 3 = —C(=O)—CH₃, 6 = —OCH₂C₆H₅, 7 = H, 4' = —OCH₂C₆H₅)

the methyl ether (Formula VI: 3 = —C(=O)—CH₃, 6 = —OCH₃, 7 = H, 4' = OCH₃)

the benzal derivative (Formula VI: 3 = —C(=O)—CH=CH—C₆H₅, 6 = OH, 7 = H, 4' = OH)

and the acetate of the benzal derivative (Formula: VI: 3 = —C(=O)—CH=CH—C₆H₅, 6 = —O—C(=O)—CH₃, 7 = H, 4' = —O—C(=O)—CH₃)

Properties of these compounds were found to be:

|  | Melting point, °C. | UV Absorption, mµ |
|---|---|---|
| Acetate | 118 | Peaks at 236 and 307. |
| Benzoate | 143–144 |  |
| Benzyl ether | 141–142 | Peaks at 239 and 327. |
| Methyl ether | 80 |  |
| Benzal derivative | 225 |  |
| Acetate of benzal derivative | 118 |  |

EXAMPLE VII

*Preparation of 2-(4-Methoxyphenyl)-3-Carbophenoxybenzofuran*

Structure: Formula VI: 3 = —C(=O)—OC₆H₅, 6 = H, 7 = H, 4' = —OCH₃

(A) 3-phenoxy-4'-methoxy flavylium chloride was prepared by condensing equimolar proportions of salicyl aldehyde and 4-methoxy-α-phenoxyacetophenone in ethyl acetate saturated with HCl gas.

(B) To 200 ml. of boiling methanol were added 10 g. of the aforesaid flavylium salt, 25 ml. of buffer solution and 25 ml. of aqueous 30% H₂O₂. An additional 50 ml. of methanol and 25 ml. of buffer solution were added to clear the solution, then heating was discontinued and the system allowed to cool. After standing about an hour, excess water was added and the precipitated crystals were collected and recrystallized from wet methanol. The benzofuran product (4 g.) had a melting point of 92° C. and exhibited peaks at 229 and 319 mµ (in ethanol).

A portion of the product was treated with alkali to hydrolyze the carbophenoxy group at position 3 to a carboxyl group. The resulting compound (Formula VI: 3=COOH, 6=H, 7=H, 4'=—OCH₃) had a melting point of 217° C. and exhibited a peak at 311 mµ (in ethanol). The carboxylic derivative was esterified with methanol to form the methyl ester (Formula VI: 3 = —C(=O)—OCH₃, 6 = H, 7 = H, 4' = —OCH₃)

This compound had a melting point of 81° C. and exhibited a peak at 311 mµ (in ethanol).

EXAMPLE VIII

*Preparation of 3-(Carbo-2-Methoxy-Phenoxy)-4'-Methoxy Benzofuran*

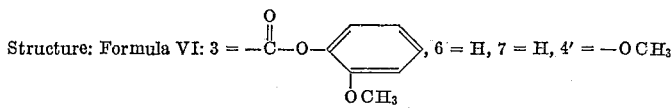

(A) 3-(o-methoxyphenoxy)-4'-methoxy flavylium chloride was prepared by condensing equimolar proportions of salicyl aldehyde and 4-methoxy - α - (2-methoxyphenoxy)-acetophenone in ethyl acetate saturated with HCl gas.

(B) To boiling methanol (20 ml.) were added 1 gram of the above flavylium salt, 5 ml. of buffer solution and aqueous 30% $H_2O_2$ (2 ml.). Heating was discontinued and the system allowed to cool. It was noted that decolorization of the solution occurred very rapidly. After standing about 5 minutes the system was diluted with water, the precipitated material collected and recrystallized from acetone-methanol. The product (0.45 g.) was in the form of colorless prisms, M.P. 126° C. A sample of the product hydrolyzed with alkali forms the carboxyl derivative (Formula VI: 3=COOH, 6=H, 7=H, 4'=—OCH₃) having a melting point of 217° C., peak at 311 mμ. A sample of the carboxyl derivative was converted to the methyl ester

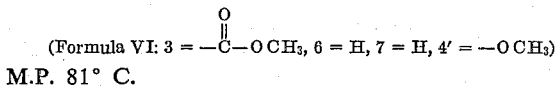

M.P. 81° C.

EXAMPLE IX

*Preparation of Benzofuran Derivative Having the Structure*

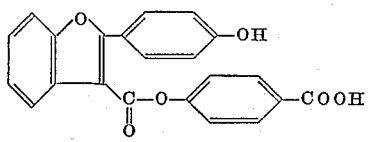

(A) 3-(4-carboxyphenoxy)-4'-hydroxy flavylium chloride was prepared by condensing equimolar proportions of salicyl aldehyde and 4-hydroxy-α-(4-carboxyphenoxy) acetophenone in ethyl acetate saturated with HCl gas.

(B) To 20 ml. of hot methanol were added 2 g. of the above flavylium salt, 10 ml. of buffer solution, and 4 ml. of 30% $H_2O_2$ solution. Additional buffer solution (10 ml.) was added to clear the solution and it was allowed to stand without heating for 10 minutes. Then the system was diluted with water, the precipitate collected and recrystallized from acetone-methanol. The benzofuran product (0.97 g.) was in the form of cream-colored glistening needles, M.P. about 264° C., peak at 327 mμ (in ethanol).

A sample of the product was methylated to produce the methyl ether-methyl ester. This compound had a M.P. of 119° C., peak at 322 mμ.

A sample of the product treated with aqueous alkali gave the carboxyl derivative (Formula VI: 3=—COOH, 6=H, 7=H, 4'=OH), M.P. 224° C., peak at 316 mμ.

EXAMPLE X

*Preparation of Benzofuran Derivative of the Structure*

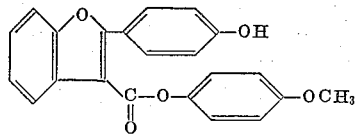

(A) 3-(4-methoxyphenoxy)-4'-hydroxy flavylium chloride was prepared by condensing equimolar proportions of salicyl aldehyde and 4-hydroxy-α-(4-methoxyphenoxy) acetophenone in ethyl acetate saturated with HCl gas.

(B) To 40 ml. of hot methanol were added 2 grams of the above flavylium salt, 15 ml. of buffer solution, and 5 ml. of 30% $H_2O_2$ solution. Heating was discontinued and the solution allowed to stand about 5 minutes. The reaction mixture was diluted with water, the precipitate collected and recrystallized from wet acetone-methanol. The benzofuran derivative (1.15 g.) was obtained as cream-colored glistening needles, M.P. 195° C., peak at 322 mμ. The acetate had a melting point of 161° C., peak at 307 mμ.

EXAMPLE XI

*Preparation of 2-(4-Methoxyphenyl)-3-Carbophenoxy-7-Methoxy Benzofuran*

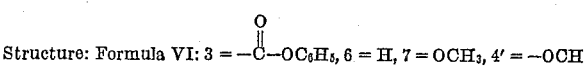

(A) 3-phenoxy-8,4'-dimethoxyflavylium chloride was prepared by condensing equimolar proportions of 2-hydroxy-3-methoxy benzaldehyde and 4-methoxy-α-phenoxy acetophenone in ethyl acetate-glacial acetic acid saturated with HCl gas.

(B) To 70 ml. of hot methanol were added 2 grams of the above flavylium salt, 5 ml. of buffer solution, and 5 ml. of 30% $H_2O_2$ solution. After allowing the mixture to stand about 5 minutes without heating, it was diluted with water and the precipitated solid collected and recrystallized from acetone-methanol. The benzofuran product (0.65 g.) had a melting point of 161° C. and peak at 317 mμ. A sample of the product treated with aqueous alkali gave the carboxy derivative (Formula VI: 3=—COOH, 6=H, 7=—OCH₃, 4'=—OCH₃), M.P. 203–204° C., peaks at 309 and 260 mμ.

EXAMPLE XII

*Preparation of 2-(4-Hydroxyphenyl)-3-Carbomethoxy Benzofuran*

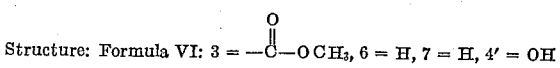

(A) 3-methoxy-4'-hydroxyflavylium chloride was prepared by condensing equimolar proportions of salicyl aldehyde and 4-hydroxy-α-methoxy acetophenone in ethyl acetate saturated with HCl gas.

(B) To 40 ml. of hot methanol were added 2 grams of the above flavylium salt, 30 ml. of buffer solution, and 4 ml. of 30% $H_2O_2$ solution. The reaction system was allowed to stand 10 minutes without heating, then it was diluted with water. The precipitate was collected and recrystallized from aqueous methanol. The product (1 g.) was in the form of colorless needles, M.P. 187° C., peak at 316 mμ. The acetate had a melting point of 135° C., peaks at 303 and 224 mμ.

EXAMPLE XIII

*Preparation of 2-(4-Methoxyphenyl)-3-Carbomethoxy Benzofuran*

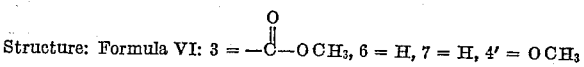

To 20 ml. of hot methanol were added 1 gram of 3,4'-dimethoxyflavylium chloride, 10 ml. buffer solution, and 2 ml. of 30% $H_2O_2$ solution. After standing for 10 minutes without applying heat, water was added, the precipitated material was collected and recrystallized from methanol. The benzofuran product (.46 g.) was in the form of cream-colored needles, M.P. 81° C.

EXAMPLE XIV

*Preparation of Coumestrol*

(A) *Preparation of Flavylium Chloride Intermediate.*—Equimolar proportions of 2,4-dihydroxybenzaldehyde and w-methoxy-2,4-dibenzyloxyacetophenone were condensed in ethereal HCl to give 3-methoxy-7-hydroxy-2′,4′-dibenzyloxy-flavylium chloride. This compound was debenzylated in acetic acid-concentrated hydrochloric acid to provide the compound 3-methoxy-2′,4′,7-trihydroxy flavylium chloride (Formula III, above). Properties of this compound were carmine-red needles recrystallized from aqueous methanolic HCl, λmax=508, 282, 263, 240 mµ (in ethanol-0.5% HCl).

(B) *Oxidation and Lactonization of Flavylium Chloride Intermediate.*—A suspension of the flavylium chloride (10 g.) in warm (about 60° C.) methanol (200 ml.) was diluted with water (100 ml.) and 20 ml. of 30% hydrogen peroxide added. After 10 minutes the yellow-brown solution of the benzofuran (Formula IV, above) was acidified with concentrated sulphuric acid (40 ml.), heated for 15 minutes on the steam bath, and allowed to cool to room temperature. Coumestrol (Formula V, above) precipitated as a fawn-colored, crystalline powder (4.18 g.). It migrated as a single, blue fluorescent (in UV light) spot on silicic acid chromatostrips and was essentially pure. Recrystallized for analysis from acetone or purified through its diacetate, coumestrol was obtained as a yellow, crystalline powder, M.P. >350° C. It was chromatographically, estrogenically, and spectrally identical with an authentic specimen of the natural estrogen.

EXAMPLE XV

Two grams of 2′,4′-dihydroxy-3,7-dimethoxy flavylium chloride was dissolved in 50 ml. of warm methanol and buffer solution (10 ml.) and 30% $H_2O_2$ solution (4 ml.) were added. The system was allowed to stand for 10 minutes, then concentrated sulphuric acid (8 ml.) and water (10 ml.) were added and the system heated on the steam bath for 20 minutes. The reaction mixture was allowed to cool and slightly pink crystals separated out (0.6 g.). This product was recrystallized from acetone-methanol, forming white needles, M.P. 338–339° C., λmax is ethanol, 342, 303, 292, 242 mµ. The product had the structure

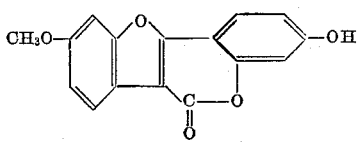

The acetate was prepared by reacting it with acetic anhydride and sodium acetate and crystallized from acetic acid-methanol: Colorless needles, M.P. 240–241° C., λmax 337, 243 mµ.

EXAMPLE XVI

The procedure of Example XV was repeated but using a different starting material, namely, 2′,4′-dihydroxy-3,8-dimethoxy flavylium chloride. The product, obtained in 45% yield, had the structure

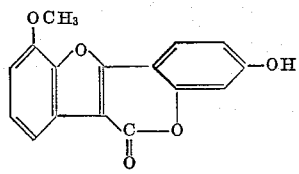

It had the following properties, M.P. 289° C., λmax (in ethanol) 330, 296, 261, 252; in ethanolic sodium ethylate, 370,305, 262 mµ.

The acetate and the methyl ether were prepared by conventional methods. These derivatives had the properties—Acetate: M.P. 197–198° C., λmax (in ethanol) 322, 293, 262, 256. Methyl ether: M.P. 195° C. λmax (in ethanol) 344, 328, 294, 259, 250.

EXAMPLE XVII

One-half gram of 2′,7-dihydroxy-3,4′-dimethoxy flavylium chloride was mixed with warm (about 60° C.) ethanol (10 ml.), water (5 ml.), 30% $H_2O_2$ solution (1 ml.) and allowed to stand 10 minutes. The system was then diluted with water to a volume of 50 ml. and the benzofuran product, 2-(2-hydroxy-4-methoxyphenyl)-3-carbomethoxy-6-hydroxy-benzofuran, was extracted with ether (three 50-ml. portions). The ether extract was washed with water, dried over $Na_2SO_4$, filtered, and evaporated. The residue was dissolved in 5 ml. glacial acetic acid; a solution of 2 ml. conc. $H_2SO_4$ in 3 ml. $H_2O$ was added and the system heated on the steam bath 20 minutes. Crystals of a slightly orange color separated (0.2 g.). This product was recrystallized from acetone-methanol, forming cream needles, M.P. 276–278° C. Structure of the product was

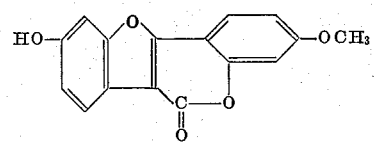

The acetate of this compound had a M.P. 205–206° C.

Having thus described the invention, what is claimed is:

A method for synthesizing a benzofuran which comprises reacting a flavylium salt of the formula

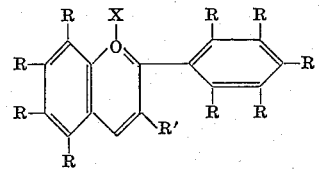

wherein each R represents a radical selected from the group consisting of hydrogen, hydroxy, lower alkyl, lower alkoxy, benzoxy, and phenoxy, R′ represents a radical selected from the group consisting of lower alkyl, lower alkoxy, phenyl, lower alkylphenyl, lower alkoxyphenyl, phenoxy, lower alkylphenoxy, lower alkoxyphenoxy, benzyl, lower alkylbenzyl, lower alkoxybenzyl, benzoxy, lower alkylbenzoxy, lower alkoxybenzoxy, carboxy-lower alkyl, carboxy-lower alkoxy, carboxyphenyl, carboxyphenoxy, carboxybenzyl, and carboxybenzoxy, and wherein X represents an anion, with a peroxygen oxidizing agent to produce a benzofuran of the formula

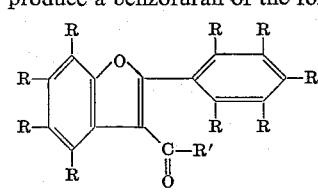

wherein R and R′ have the aforesaid significance.

References Cited by the Examiner

UNITED STATES PATENTS

| | | | |
|---|---|---|---|
| 2,748,146 | 5/56 | Schrader | 260—343.2 |
| 3,012,042 | 12/61 | Hoi et al. | 260—346.2 |
| 3,027,382 | 3/62 | Bickoff et al. | 260—246.2 |
| 3,061,613 | 10/62 | Newallis et al. | 260—343.2 |

OTHER REFERENCES

Kruber et al.: Chem. Ber. vol. 84 (1951) pages 831–33.

Grinev et al.: Chemical Abstracts, vol. 50 (1956) column 16737e.

IRVING MARCUS, *Primary Examiner.*

NICHOLAS S. RIZZO, WALTER A. MODANCE,
*Examiners.*